March 5, 1963   G. R. HARVEY, JR   3,080,219
CONTROL SYSTEM
Filed May 9, 1960   2 Sheets-Sheet 1

INVENTOR.
G. R. HARVEY, JR
BY Hudson & Young
ATTORNEYS

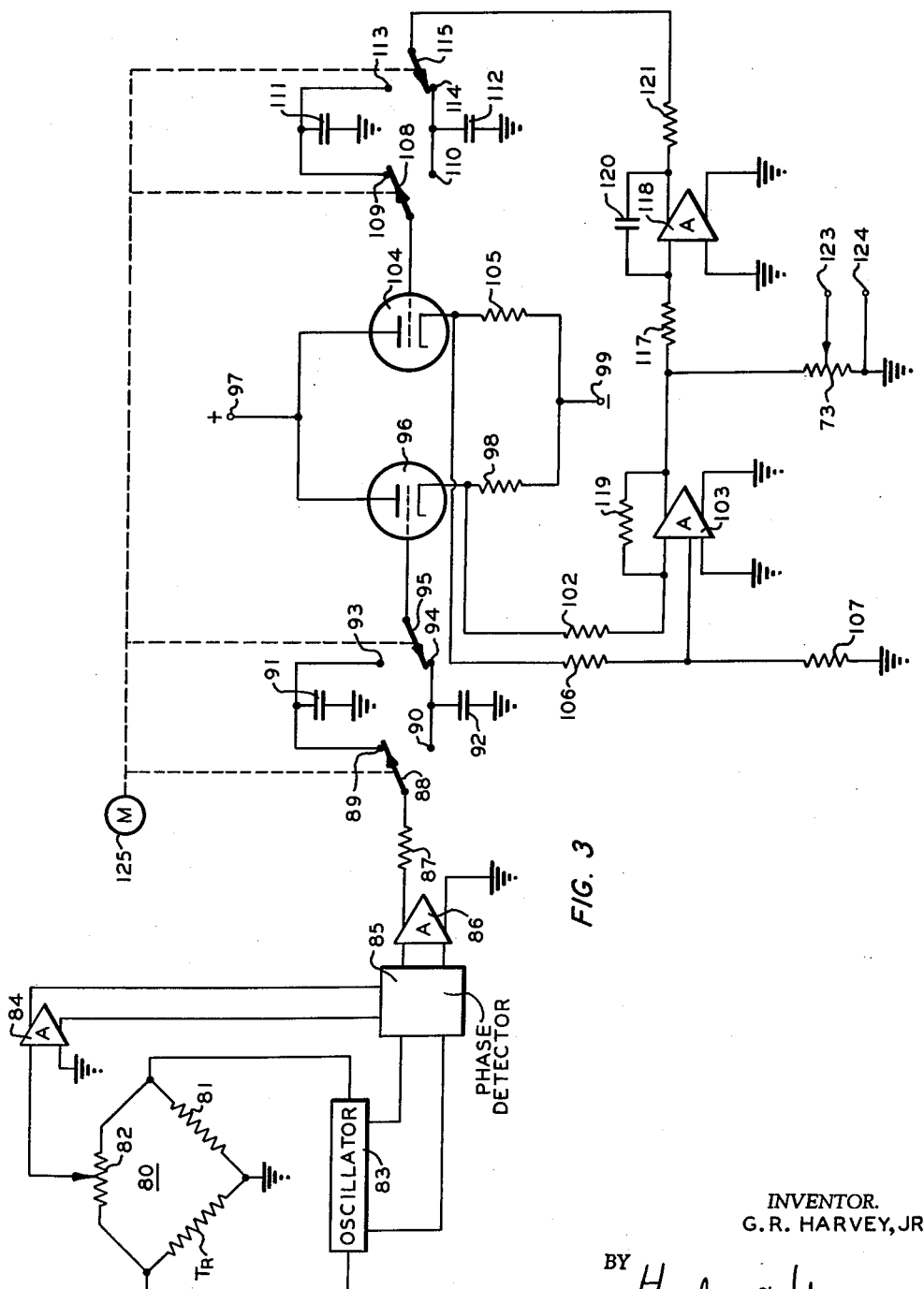

United States Patent Office 3,080,219
Patented Mar. 5, 1963

3,080,219
CONTROL SYSTEM
George R. Harvey, Jr., Houston, Tex., assignor to Phillips Petroleum Company, a corporation of Delaware
Filed May 9, 1960, Ser. No. 27,649
8 Claims. (Cl. 23—253)

This invention relates to apparatus for measuring and controlling the rates of polymerization reactions. In another aspect it relates to novel computing apparatus.

Various methods are known for producing solid and semisolid polymers. For example, hydrocarbons such as ethylene, propylene, isobutane and butadiene can be polymerized, either independently or in various admixtures with one another, to produce solid or semisolid polymers. Considerable attention has recently been directed toward the production of solid olefin polymers such as polymers of ethylene and/or propylene. These polymerizations are frequently carried out in the presence of a solid catalyst and employing a liquid solvent as the reaction medium. The polymerization reactions are exothermic so that it becomes necessary to remove heat liberated by the reaction. This removal of heat is often accomplished by employing a reactor with indirect heat exchange means through which a suitable coolant is circulated. One of the problems which arises in such a system involves controlling the polymerization reaction rate so that uniform product having desired properties is obtained.

In accordance with the present invention, apparatus is provided for measuring the rates of polymerization reactions and for controlling polymerization processes in an automatic manner. This control is based on a measurement of the heat liberated by the polymerization reaction. Such a measurement is made by subtracting the heat supplied to the reactor from the heat removed from the reactor. The difference between these two heat quantities is thus representative of the amount of polymer produced. The apparatus of this invention utilizes a relatively small number of sample components to make the necessary measurements and computations.

Accordingly, it is an object of this invention to provide improved apparatus for measuring and controlling polymerization reactions.

Another object is to provide simplified computing apparatus.

Other objects, advantages and features of the invention should become apparent from the following detailed description, taken in conjunction with the accompanying drawing in which:

FIGURE 3 is a schematic circuit drawing of the temperature compensator employed in the computer of FIGURE 2.

This invention is broadly applicable to polymerization processes in general, and particularly to processes in which an olefin is polymerized in the presence of a catalyst which is suspended on a solid. The invention is especially applicable for use in controlling polymerization processes of the type described in U.S. Patent 2,825,721. In order to describe the operation of the control system of this invention, reference will be made to the polymerization of ethylene to form a solid polymer in accordance with the process described in said Patent 2,825,721.

Figure 1:
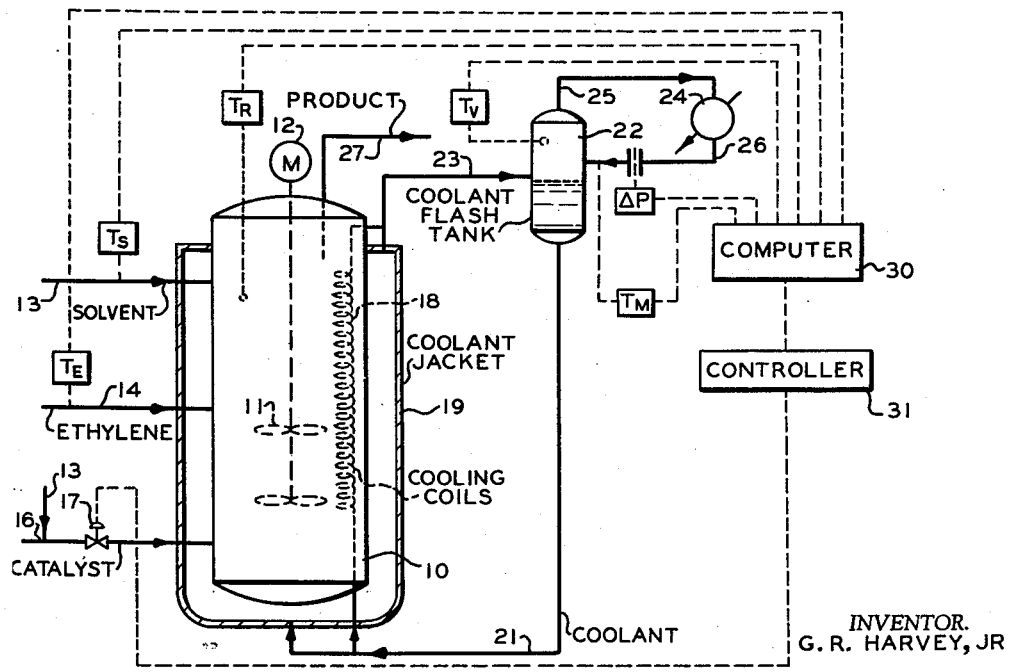
FIGURE 1 is a schematic representation of a polymerization system having the control apparatus of this invention associated therewith.

In FIGURE 1 of the drawing there is shown a reactor 10 which is provided with a stirrer 11 that is rotated by a motor 12. A solvent, cyclohexane, for example, enters reactor 10 through a conduit 13. Ethylene to be polymerized is introduced into reactor 10 through a conduit 14. A solid catalyst, which can be in the form of a slurry with cyclohexane, is directed into reactor 10 through a conduit 16 which has a control valve 17 therein. Reactor 10 is provided with internal cooling coils 18 and with a jacket 19 through which a coolant is circulated. This coolant, which advantageously is cyclohexane, is introduced into jacket 19 and coil 18 through a conduit 21 which extends from a flash tank 22. The coolant is at least partially vaporized in passing through jacket 19 and coil 18 and is removed through a conduit 23 which communicates with flash tank 22. The vapors in flash tank 22 are directed to a condenser 24 through a conduit 25. The resulting condensate is returned to tank 22 through a conduit 26. The polymer product is removed from reactor 10 through a conduit 27.

From an inspection of FIGURE 1, it should be evident that heat is added to and removed from reactor 10 in several ways. The apparatus of the present invention computes the total heat produced from the polymerization reaction by subtracting the heat which enters the reactor from the heat that is withdrawn from the reactor. In order to make these computations, temperature transducers $T_s$, $T_e$ and $T_M$ are provided to measure the temperatures of fluids in respective conduits 13, 14 and 26. A temperature transducer $T_R$ measures the temperature within reactor 10, and a temperature transducer $T_V$ measures the temperature of the vapor in flash tank 22. A differential pressure transducer $\Delta P$ establishes a signal representative of the rate of flow of liquid through conduit 26. Signals from all of these transducers are transmitted to a computer 30 which provides an output signal representative of the rate of production of polymer in reactor 10. This output signal is employed to adjust the set point of a controller 31 to adjust valve 17 to regulate the flow of catalyst into the reactor. If the computed production rate becomes excessive, the flow of catalyst is reduced, whereas the flow of catalyst is increased if the production rate becomes too small.

The first source of heat addition to the reactor results from the introduction of solvent into the reactor. This heat $Q_1$ is represented by the equation:

$$Q_1 = F_1 \times C_1 \times \Delta T_s \qquad (1)$$

where:
$F_1$ = flow rate of solvent
$C_1$ = specific heat of solvent
$\Delta T_s$ = temperature differential between solvent and reactor.

The heat $Q_2$ resulting from the addition of ethylene to the reactor is represented by the equation:

$$Q_2 = F_2 \times C_2 \times \Delta T_E \qquad (2)$$

where:
$F_2$ = flow rate of ethylene
$C_2$ = specific heat of ethylene
$\Delta T_E$ = temperature differential between ethylene feed and reactor.

The heat of solution of ethylene in the solvent liberates a quantity of heat $Q_3$ in accordance with the equation:

$$Q_3 = F_2 \times C_3 \qquad (3)$$

where $C_3$ = specific heat of solution, a negative quantity.

The sensible heat $Q_4$ removed by cooling of the condensed vapors from the flash tank is represented by the equation:

$$Q_4 = F_3 \times C_4 \times \Delta T_M \qquad (4)$$

where:
$F_3$ = flow of liquid through conduit 26
$C_4$ = specific heat of coolant $\Delta T_M$ = temperature differential between coolant tank vapor and cooled liquid coolant The heat $Q_5$ removed by coolant vaporization at a reference vaporization temperature of 130° F., for example, is represented by the equation:

$$Q_5 = F_3 \times C_5 \qquad (5)$$

where $C_5$ = heat of vaporization of coolant.

The heat $Q_6$ represented by coolant vapor existing at a temperature other than 130° F. is expressed:

$$Q_6 = F_3 \times C_4 \times (130 - T_v) \qquad (6)$$

where $C_4$ = specific heat of coolant vapor.

A constant amount K of heat $Q_7$ represents the net heat loss from the reactor and conduits:

$$Q_7 = K \qquad (7)$$

In practice, the catalyst is introduced as a slurry in solvent. This provides one additional source of heat addition $Q_8$ to the reactor:

$$Q_8 = F_4 \times C_1 \times \Delta T_s \qquad (8)$$

where $F_4$ = flow rate of solvent with catalyst.

Figure 2:
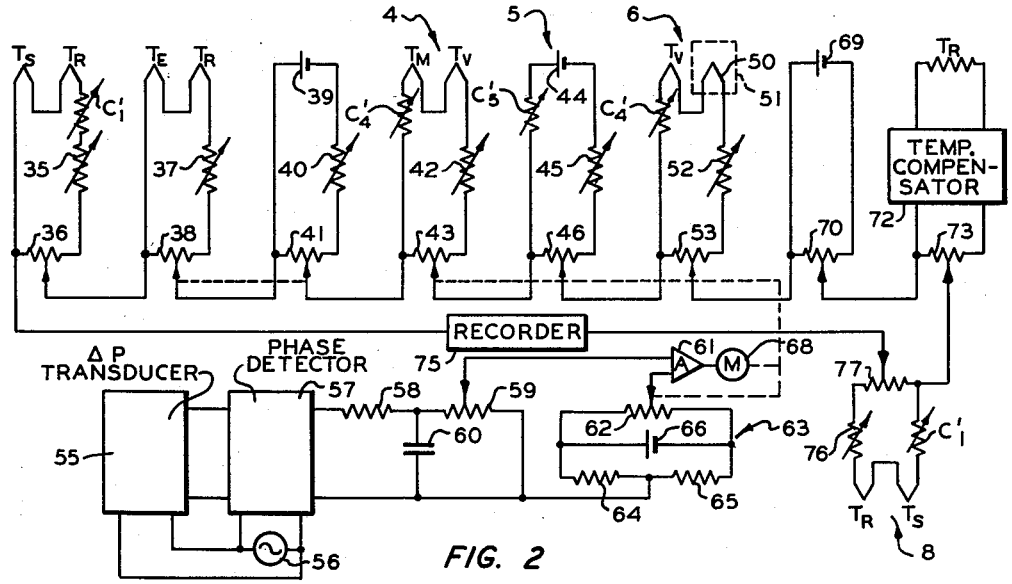
FIGURE 2 is a schematic circuit drawing of the computer of this invention.

The apparatus illustrated in FIGURE 2 establishes an electrical signal representative of each of the quantities of heat described in the foregoing equations. The heat added to the reactor is effectively subtracted from the heat removed so that the difference is representative of the production rate. With reference to Equation 1, the term $\Delta T_S$ is established by the two thermocouples $T_S$ and $T_R$. These two thermocouples are connected in opposition to one another and in series with a variable resistor 35 and a potentiometer 36. Resistor 35 is set in accordance with the constant $C_1$, and the contactor of potentiometer 36 is set in accordance with the flow rate of the solvent through conduit 13. The voltage between the contactor and the left-hand end terminal of potentiometer 36 is thus representative of the heat quantity $Q_1$ of the Equation 1. Thermocouples $T_E$ and $T_R$ are connected in opposition to provide a signal representative of the quantity $\Delta T_E$ of Equation 2. These two potentiometers are connected in series relationship with a resistor 37 and a potentiometer 38. Resistor 37 is adjusted to be representative of the constant $C_2$, and the contactor of potentiometer 38 is set in accordance with the flow of ethylene through conduit 14. The heat quantity $Q_3$ of Equation 3 is established by the network which includes a voltage source 39, a variable resistor 40 and a potentiometer 41 which are connected in series relationship. Resistor 40 is set in accordance with the constant $C_3$, and the contactor of potentiometer 41 is set in accordance with the flow rate of ethylene through conduit 14. The contactor of potentiometer 36 is connected to the left-hand end terminal of potentiometer 38, and the contactor of potentiometer 38 is connected to the left-hand end terminal of potentiometer 41. This arrangement results in a summation of the heat quantities $Q_1$ and $Q_2$ and $Q_3$. A voltage representing this sum thus appears between the contactor of potentiometer 41 and the left-hand end terminal of potentiometer 36.

Voltages representative of the heat quantities $Q_4$, $Q_5$ and $Q_6$ are established by respective networks 4, 5 and 6. The quantity $\Delta T_M$ of Equation 4 is established by thermocouples $T_M$ and $T_V$ which are connected in opposition to one another. These thermocouples are connected in series with a variable resistor 42 and a potentiometer 43. The setting of resistor 42 is representative of the constant $C_4$, and the setting of potentiometer 43 is representative of the flow of coolant through conduit 26. A voltage source 44 is connected in series with a variable resistor 45 and a potentiometer 46 in network 5. Resistor 45 is set in accordance with the constant $C_5$, and the contactor of potentiometer 46 is set in accordance with the flow of coolant through conduit 26. In network 6, thermocouple $T_V$ is connected in opposition to a reference thermocouple 50 which is maintained at a constant temperature of 130° F. This can be accomplished by means of a housing 51 which is maintained at a constant temperature by a heater which is controlled by a thermostat, not shown. Thermocouples $T_V$ and 50 are connected in series with a variable resistor 52 and a potentiometer 53. Resistor 52 is set in accordance with the constant $C_4$ and potentiometer 53 is set in accordance with the flow of coolant through conduit 26. The contactor of potentiometer 43 is connected to the left-hand end terminal of potentiometer 46, and the contactor of potentiometer 46 is connected to the left-hand end terminal of potentiometer 53.

Since potentiometers 43, 46 and 53 are all set in accordance with the flow of coolant through conduit 26, the contactors of these potentiometers are mechanically connected to one another. This flow may change substantially during operation of the reactor so that these potentiometers are set in accordance with the measured flow through conduit 26. A differential pressure transducer 55 is employed to provide a signal representative of the differential pressure across an orifice in conduit 26, this pressure differential being representative of the rate of flow through the conduit. Transducer 55 is of a type which is energized from a source of alternating current 56 to provide an alternating signal representative of the measured flow. This alternating signal is applied to the first input terminals of a phase detector 57. A reference signal from alternating current source 56 is also applied to the phase detector. Phase detector 57 provides an output direct current signal which is representative of the measured flow. One output terminal of phase detector 57 is connected through a resistor 58 to the first end terminal of a potentiometer 59. The second end terminal of potentiometer 59 is connected to the second output terminal of the phase detector. A capacitor 60 is connected between the second output terminal of phase detector 57 and the junction between resistor 58 and potentiometer 59. The contactor of potentiometer 59 is connected to the first input terminal of a servo amplifier 61. The second input terminal of amplifier 61 is connected to the contactor of a potentiometer 62 which is connected in a bridge network 63. Potentiometer 62 can be non-linear to provide an output representative of flow, the signal $\Delta P$ being representative of the square of flow. Resistors 64 and 65 constitute the opposite arms of bridge network 63. A voltage source 66 is connected across first opposite terminals of the bridge network. The junction between resistors 64 and 65 is connected to the second output terminal of phase detector 57.

The output signal of servo amplifier 61 energizes a motor 68, the drive shaft of which is connected to the contactors of potentiometers 43, 46, 53 and 62. Motor 68 and the circuit associated therewith forms a self-balancing bridge network whereby the contactor of potentiometer 62 is moved in response to any change in the output signal of the differential pressure transducer in order to restore the bridge to a balanced condition. The position of the drive shaft of motor 68 is thus representative of the rate of flow which is detected by transducer 55. Potentiometers 43, 46 and 53 are set by motor 68 in accordance with the measured flow. If desired, potentiometers 36, 38 and 41 can be set in a corresponding manner in response to actual measurements of the flows through conduits 13 and 14. However, these flows generally remain substantially constant so that no appreciable error results from setting these potentiometers initially.

The heat quantity $Q_7$ is established by a voltage source 69 which is connected across a potentiometer 70. The contactor of potentiometer 53 is connected to the left-hand end terminal of potentiometer 70.

In addition to the heat carried out of the reactor and the heat generated within the reactor as defined by the equations discussed above, a dynamic correction is included in the heat balance computer to compensate for heat accumulation or depletion in the reactor due to changes in the reactor temperature. This compensation is provided by a temperature compensator circuit 72 which provides an output signal representative of the rate of change of temperature within the reactor. The output signal of circuit 72 is applied across a potentiometer 73. Temperature compensator 72 responds to a temperature sensitive resistance element $T_R$ which is positioned within the reactor. The contactor of potentiometer 70 is connected to the left-hand end terminal of potentiometer 73. Network 8 establishes a signal representative of Equation 8. Thermocouples $T_S$ and $T_R$ are employed as in the first network. The differential output signal from these thermocouples is applied through a variable resistor 76 across a potentiometer 77. The contactor of potentiometer 73 is connected to the left-hand end terminal of potentiometer 73. Of course, network 8 can be eliminated if the flow of solvent with the catalyst is negligible. The left-hand end terminal of potentiometer 36 and the contactor of potentiometer 77 are connected to the respective input terminals of a recorder 75. The signal applied to recorder 75 is thus representative of the difference between the heat added to and the heat removed from the reactor. This difference is obtained by proper connection of the polarities of all the voltage sources and thermocouples. The resulting voltage difference is representative of the rate of production of polymer within the reactor. Recorder 75 provides an output signal, not shown, to actuate controller 31 of FIGURE 1.

The "constants" $C_1$, $C_4$ and $C_5$ actually are functions of temperature. Any variations in these quantities at different temperatures are compensated for by respective thermistors $C_1'$, $C_4'$ and $C_5'$ which are disposed in the respective fluid streams.

The temperature compensator 72 of FIGURE 2 is illustrated in FIGURE 3. Temperature sensitive resistance element $T_R$ forms one arm of a bridge network 80. A resistor 81 is connected in the adjacent arm of the network, and a potentiometer 82 forms the third and fourth arms of the network. Bridge 80 is energized from oscillator 83 which is connected across the end terminals of potentiometer 82. The contactor of potentiometer 82 is connected to the first input terminal of an amplifier 84, the second input terminal of which is grounded, as is the junction between resistors $T_R$ and 81. The output signal of amplifier 84 is applied to the first input terminals of a phase detector 85. A signal from oscillator 83 is applied to the second input terminals of phase detector 85. The output signal from phase detector 85, which is a direct current signal, is amplified by an amplifier 86. The output signal from amplifier 86 is thus a D.C. voltage which is representative of the temperature within reactor 10.

The first output terminal of amplifier 86 is connected through a resistor 87 to a switch 88 which is adapted to engage terminals 89 and 90 selectively. The first terminals of capacitors 91 and 92 are connected to terminals 89 and 90, respectively. The second terminals of capacitors 91 and 92 are connected to ground. The first terminals of capacitors 91 and 92 are also connected to respective terminals 93 and 94 which are adapted to be engaged selectively by a switch 95. Switch 95 is connected to the control grid of a triode 96. The anode of triode 96 is connected to a terminal 97 which is maintained at a positive potential, and the cathode of triode 96 is connected through a resistor 98 to a terminal 99 which is maintained at a negative potential. The cathode of triode 96 is also connected through a resistor 102 to the first input terminal of a differential amplifier 103.

The circuit of FIGURE 3 is provided with a second triode 104. The anode of triode 104 is connected to terminal 97, and the cathode of triode 104 is connected through a resistor 105 to terminal 99. The cathode of triode 104 is also connected through a resistor 106 to a second input terminal of amplifier 103. The control grid of triode 104 is connected to a switch 108 which is adapted to engage terminals 109 and 110 selectively. Terminals 109 and 110 are connected to first terminals of respective capacitors 111 and 112, the second terminals of which are connected to ground. The first terminals of capacitors 111 and 112 are connected to respective terminals 113 and 114 which are adapted to be engaged selectively by a switch 115. The first output terminal of amplifier 103 is connected through a resistor 117 to the first input terminal of an integrating amplifier 118. Amplifier 103 is provided with a feedback resistor 119, and amplifier 118 is provided with a feedback capacitor 120. The first output terminal of amplifier 118 is connected through a resistor 121 to switch 115. The first output terminal of amplifier 103 is connected to ground through a potentiometer 73. Output terminals 123 and 124 are connected to the contactor of potentiometer 73 and ground, respectively.

As previously mentioned, the rate of change of the reactor temperature is representative of the amount of heat accumulated within or dissipated from the reactor. The circuit of FIGURE 3 provides a means for comparing a given reactor temperature with a previous reactor temperature in order to determine the rate of temperature change. The drive shaft of a timing motor 125 is connected to switches 88, 95, 108 and 115 so as to actuate these switches in unison. When the switches are in the positions illustrated, the output signal from amplifier 86, which represents the reactor temperature, is stored on capacitor 91. At this time, the signal previously stored on capacitor 92, which represents the reactor temperature at an earlier time, is applied through cathode follower 96 to the first input of differential amplifier 103. The output signal of amplifier 103 is integrated and stored on capacitor 112. At this same time, the integrated signal previously stored on capacitor 111 is applied through cathode follower 104 to the second input of differential amplifier 103. Thus, the output signal of amplifier 103 represents the change in reactor temperature over a given time interval. This time interval is the frequency at which switches 88, 95, 108 and 115 are actuated by timer 125, which can be of the order of 10 seconds, for example. At the end of the next time interval, the switches are moved to the opposite positions so that the incoming reactor temperature signal is stored on capacitor 92 and the signals compared by amplifier 103 are the signals previously stored on capacitors 91 and 112. The output signal from amplifier 103 is applied across potentiometer 73, and the output signal between terminals 123 and 124 is applied to the summing circuit of FIGURE 2.

In view of the foregoing description, it can be seen that a relatively simple reactor control system is provided in accordance with this invention to measure and control polymerization processes. It is generally desirable to maintain the reactor temperature substantially constant in order to produce polymer having selected properties. This can be accomplished by a conventional control system, as by regulating coolant flow, for example. The present invention provides additional control to maintain a substantially constant rate of production by adding fresh catalyst as may be necessary.

While the invention has been described in conjunction with a present preferred embodiment, it obviously is not limited thereto.

What is claimed is:

1. In a polymerization system including a reactor, first conduit means communicating with said reactor to introduce material to be polymerized, second conduit means communicating with said reactor to introduce a solvent, third conduit means communicating with said reactor to introduce a catalyst, fourth conduit means communicating with said reactor to remove a product, heat exchange conduit means in communication with said reactor to remove heat, a flash tank, fifth conduit means communicating between said flash tank and said heat exchange conduit means to introduce a liquid coolant into said heat exchange conduit means, sixth conduit means communicating between said heat exchange conduit means and said flash tank to return vapor to said flash tank, a condenser, seventh conduit means to pass vapor from said flash tank through said condenser and to return condensate to said flash tank; apparatus for measuring the rate of polymer production comprising means to establish a first voltage representative of the difference between the temperature of the reactor and the temperature of solvent in said second conduit means; means to establish a second voltage representative of the difference between the temperature of the reactor and the temperature of material in said first conduit means; means to establish a third voltage representative of the heat of solution of the material to be polymerized in said solvent; first, second and third potentiometers; means applying said first, second and third voltages across the end terminals of said first, second and third potentiometers, respectively; means to sum the voltages between first end terminals and contactors of said first, second and third potentiometers to establish a fourth voltage; means to establish a fifth voltage representative of the difference between the temperature of material in said reactor and vapor in said flash tank; means to establish a sixth voltage representative of the heat of vaporization of said coolant; means to establish a seventh voltage representative of the difference between a reference temperature and the temperature of vapor in said flash tank; means to establish an eighth voltage representative of heat loss from said reactor; fourth, fifth, sixth and seventh potentiometers; means applying said fifth, sixth, seventh and eighth voltages across the end terminals of said fourth, fifth, sixth and seventh potentiometers, respectively; means to sum the voltages between first end terminals and contactors of said fourth, fifth, sixth and seventh potentiometers to establish a ninth voltage; and means to compare said ninth voltage with said fourth voltage.

2. The apparatus of claim 1 further comprising means responsive to said means to compare to regulate the flow of catalyst through said third conduit means.

3. The apparatus of claim 2 further comprising an eighth potentiometer, means applying a voltage across said eighth potentiometer representative of heat supplied to said reactor through said third conduit means, and means to add the voltage between one end terminal and the contactor of said potentiometer to said ninth voltage.

4. The apparatus of claim 1 further comprising means to establish a signal representative of the flow of liquid coolant through said seventh conduit means, and means responsive thereto to adjust the positions of the contactors of said fourth, fifth, sixth and seventh potentiometers.

5. The apparatus of claim 1 further comprising temperature sensing means positioned within said reactor, means responsive to said temperature sensing means to establish a tenth voltage representative of changes in temperature within said reactor in a preselected time interval, and means to add said tenth voltage to said ninth voltage.

6. The apparatus of claim 1 further comprising means to adjust individually said first, second, third, fifth, sixth and seventh voltages.

7. A computing system comprising first, second, third, fourth, fifth, sixth and seventh potentiometers; first and second thermocouples connected in opposition to one another; first means connecting said first and second thermocouples across the end terminals of said first potentiometer; third and fourth thermocouples connected in opposition to one another; second means connecting said third and fourth thermocouples across the end terminals of said second potentiometer; a first voltage source; third means connecting said first voltage source across the end terminals of said third potentiometer; fifth and sixth thermocouples connected in opposition to one another; fourth means connecting said fifth and sixth thermocouples across the end terminals of said fourth potentiometer; a second voltage source; fifth means connecting said second voltage source across the end terminals of said fifth potentiometer; seventh and eighth thermocouples connected in opposition to one another; sixth means connecting said seventh and eighth thermocouples across the end terminals of said sixth potentiometer; a third voltage source connected across the end terminals of said seventh potentiometer; means to sum the voltages between the contactors and first end terminals of said first, second and third potentiometers to establish a first signal; means to sum the voltages between the contactors and first end terminals of said fourth, fifth, sixth and seventh potentiometers to establish a second signal; and means to compare said first and second signals.

8. The system of claim 6 wherein said first, second, third, fourth, fifth and sixth means each include an adjustable impedance element.

References Cited in the file of this patent
UNITED STATES PATENTS 2,881,235    Van Poole _____ Apr. 7, 1959
2,908,734    Cottle _____ Oct. 13, 1959